US006480801B2

(12) United States Patent
Chew (10) Patent No.: US 6,480,801 B2
(45) Date of Patent: Nov. 12, 2002

(54) UNIVERSAL SERIAL BUS TEST SYSTEM (75) Inventor: Michael N. Chew, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 10/038,269

(22) Filed: Oct. 19, 2001

(65) Prior Publication Data

US 2002/0087285 A1 Jul. 4, 2002

Related U.S. Application Data

(63) Continuation of application No. 09/233,404, filed on Jan. 19, 1999, now Pat. No. 6,343,260.

(51) Int. Cl.[7] .............................................. G06F 19/00
(52) U.S. Cl. ...................................... 702/122; 714/43
(58) Field of Search .............................. 702/122, 123, 702/108, 119, 120; 710/63, 16, 17, 104, 19; 340/500, 505, 531; 714/1, 25, 43, 44, 56

(56) References Cited

U.S. PATENT DOCUMENTS

| | | | |
|---|---|---|---|
| 6,012,103 A | 1/2000 | Sartore et al. | 710/8 |
| 6,098,120 A | 8/2000 | Yaotani | 710/16 |
| 6,105,097 A | 8/2000 | Larky et al. | 710/129 |
| 6,119,194 A | 9/2000 | Miranda et al. | 710/129 |
| 6,157,975 A * | 12/2000 | Brief et al. | 713/300 |
| 6,170,062 B1 | 1/2001 | Henrie | 713/340 |
| 6,178,514 B1 | 1/2001 | Wood | 713/300 |
| 6,185,569 B1 | 2/2001 | East et al. | 707/101 |
| 6,389,560 B1 | 5/2002 | Chew | 714/43 |

OTHER PUBLICATIONS

Adams, et al., "Conformance Testing of VMEbus and Multibus II Products," IEEE Micro, vol. 12, No. 1, Feb. 1992, pp. 57–64.

Zelms, "On–Line Diagnosis of Peripherals in a Minicomputer System," Proceedings of the National Electronic Conference, Oct. 1980, pp. 545–550.

Universal Serial Bhus Specification Revision 1.0, Jan. 1996, pp. 2–9, 165–172.

Dreitlin, "The Challenge of Testing SCSI Peripherals," Electronics Test, vol. 13, No. 6, Jun. 1990, 4 pgs.

European Search Report, Application No. 00 30 0324, mailed Jul. 26, 2000.

"Universal Host Controller Interface (UHC1) Design Guide; Revision 1.1," Intel Corporation, Mar., 1996.

* cited by examiner

Primary Examiner—Hal Wachsman
Assistant Examiner—Edward Raymond
(74) Attorney, Agent, or Firm—B. Noël Kivlin (57) ABSTRACT

A system and method for testing the conformance of a universal serial bus (USB) system to a set of predefined USB Specifications. One embodiment of the system comprises a test system that can be used to determine whether a selected USB device provides appropriate data in response to a set of standard device requests. In another embodiment, the test system performs a series of tests to validate the interface functions of a USB driver. The system can test the device responses without having to create or compile a test program. The test system comprises a test application and a test application driver. The test application driver interfaces with the USB driver of the USB system software. The USB system software also includes a host controller driver. The host controller driver interfaces with the host controller and thereby interfaces the software on the host system with the USB interconnect and USB devices. In one embodiment, the test system incorporates a command line interpreter through which a user can enter commands to perform selected tests on the USB system. The command line interpreter enables the user to execute commands in an operating system (e.g., Unix) shell without having to interrupt a USB testing or debugging session. The user may also enter commands and perform USB system testing remotely via a communications link between the user and the system's host computer.

23 Claims, 6 Drawing Sheets

UNIVERSAL SERIAL BUS TEST SYSTEM

This application is a continuation of U.S. patent application Ser. No. 09/233,404, filed Jan. 19, 1999, now U.S. Pat. No. 6,343,260, issued Jan. 20, 2002.

BACKGROUND OF THE INVENTION

1. Field of the Invention

The invention relates generally to computer systems and more particularly to systems and methods for testing the functional compatibility of peripheral devices with a universal serial bus system.

2. Description of the Relevant Art

Since the advent of personal computers, computer users have been eager to expand the capabilities of their machines. Users, however, have experienced innumerable difficulties when confronted with the task of connecting peripheral devices to their computers. While it may be simple for a user to attach a printer to his or her computer, the connection of a device (e.g., a scanner) to a serial port presents more of a challenge. The installation of equipment internal to the computer, such as an interface card for a scanner, may present even greater difficulties, as the user may face problems in setting and DMA addresses for resolving IRQ conflicts. These difficulties can frustrate the user, particularly when they cause the computer to operate incorrectly or simply fail to operate at all.

With the rapid advances in the state of computer technology, the potential for experiencing such difficulties has grown. There have, as a result, been attempts to alleviate these problems. For example, the concept of designing plug-and-play peripheral devices was intended to alleviate difficulties of installing the devices. This concept, however, is directed primarily toward devices which are installed inside the cabinet of the computer. The installation of external peripheral devices, such as printers and scanners, is still likely to be accompanied by some of the difficulties targeted by the plug-and-play concept.

Another attempt to eliminate some of the problems attendant to the installation of peripheral devices was the introduction of PC-Card technology. (This technology was formerly termed PCMCIA—Personal Computer Memory Card International Association.) PC-Card (PCMCIA) peripheral devices are simply and easily inserted into a PC-Card socket and are recognized by the computer. The problem with this technology, however, was that it was originally targeted to portable computers. Although a PC-Card (PCMCIA) slot can be installed in a desktop computer, this solution simply has not been widely adopted. Thus, there remained a need for a simple and convenient plug-and-play type technology for desktop computers.

SUMMARY OF THE INVENTION

One or more of the problems outlined above may be solved by various embodiments of the system and method of the present invention. In response to the continuing difficulties in installing peripheral devices and the need for a solution to the problem, the idea of a universal serial bus (USB) was developed. The development of the USB was motivated by number of factors, including the difficulty of adding peripheral devices and the lack of additional ports for installing these devices. The USB is designed to provide plug-and-play capabilities for external peripheral devices which are connected to the I/O ports of the computer and thereby reduce the difficulties experienced by many users.

The USB was also designed to provide means for installing numerous devices rather than restricting the user to one or two (one for each port on a computer which does not have a USB).

The implementation of plug-and-play capabilities through the USB is not solely dependent upon the USB. It is fundamental that the peripheral devices to be installed on the USB must be compatible with the USB. In other words, it is necessary that the devices conform to the specific characteristics of the USB. This is ensured in part by the propagation of the USB Specification, which defines these characteristics. The USB Specification is hereby incorporated herein by reference in its entirety. The designs of peripheral devices can be checked prior to manufacture through device simulations. Such verification of device designs, however, may themselves contain errors. Additionally, errors may be introduced in translation of the design into a physical device. It is therefore important to have means for verifying different aspects of USB compatibility of peripheral devices in their final physical configurations. It is also important to have means for verifying USB system functions apart from the peripheral devices. The various embodiments of the invention provide such means.

One embodiment of the invention comprises a test system which verifies the ability of USB devices to provide correct responses to a set of standard device requests. The standard device requests allow USB devices to be queried for standard device information, such as vendor identification, device class, and configuration. Other device-class related and vendor defined information may also be obtained through the standard device requests. The test system allows USB device vendors to determine whether their devices properly provide this information as provided for in the USB Specification.

Another embodiment of the invention comprises a test system which verifies the implementation of the USB Architecture Framework Support in a computer system. The USB Architecture (USBA) consists of a library of interfaces which provide channels of communication between a USB client driver and an associated USB device. The test system performs calls to the USBA interfaces and then decodes and validates test parameters to determine whether they are valid.

The test system comprises a test application and a test application driver. The test application driver interfaces with the USB system software. The USB system software, which may include a USB driver, a host controller driver and other host software, is referred to in a Solaris™ implementation as the USB Framework Support. (Solaris™ is a Unix operating system developed by Sun Microsystems, Inc. for use on its SPARC™ workstations.) The USB driver interfaces with the test application through the test application driver. The host controller driver interfaces with the host controller, which in turn interfaces the software on the host system with the USB interconnect and USB devices.

In one embodiment, the test system incorporates a command line interpreter through which a user can enter commands to perform specific operations and tests, or combinations thereof, on the USB system. The user may thereby verify the sets of standard device requests or interface functions as part of a suite of tests, or they may be verified individually through the command line interpreter. The individual testing of the standard device requests or interface functions may be useful to avoid unnecessary tests on previously verified portions of the system. The command line interpreter allows the standard device requests and interface functions to be tested without having to create or compile a test program. Use of the command line interpreter further allows the user to execute commands in an operating system (e.g., Unix) shell without having to interrupt a USB testing or debugging session. Use of the command line interpreter also allows the user to enter commands remotely (e.g., via a modem connected to the computer system) so that the expertise of a user who is not located at the site of the computer system.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is described below. In this embodiment, a host computer utilizes a USB system. The USB system includes a USB, a USB host controller coupled to the USB, a host controller driver for driving the host controller and a set of USB interfaces which allow communications between a test application and the host controller driver. The test application includes a test application driver which interfaces with the USB host software. The test application is configured to examine device descriptors for USB devices and construct state information for the devices which is maintained in the test application driver. The test application constructs test cases to verify the USB interface functions and the USB devices' responses to standard device requests. The test application allows the user to take these actions without having to first create and compile a test application. The test application thereby facilitates the verification the USB interface functions and verify that the USB devices connected to the USB behave as required by the USB Specification.

The development of the USB was motivated primarily by three considerations. First, personal computers have traditionally had limited flexibility in regard to reconfiguration of the computer. A number of advances were made in the areas of graphical user interfaces and internal bus architectures which made personal computers more user-friendly, but there was little progress in improving the connectivity of peripheral devices to desktop systems (despite the success of PC-Card plug-and-play peripherals in portable computers.) Second, personal computers typically had a limited number of ports to which peripheral devices could be connected. A typical system, for example, might have a single parallel port and one or two serial ports. Users were therefore prevented from having more than two or three peripheral devices corresponding to the two or three ports on their computers. Third, although there has been significant potential for computing and communication functions to benefit from each other, these technologies have evolved essentially independently so that the technologies were not easily merged. There was therefore a need for an easy and inexpensive means to communicate information via computers. The USB was designed to meet these needs.

Figure 1:
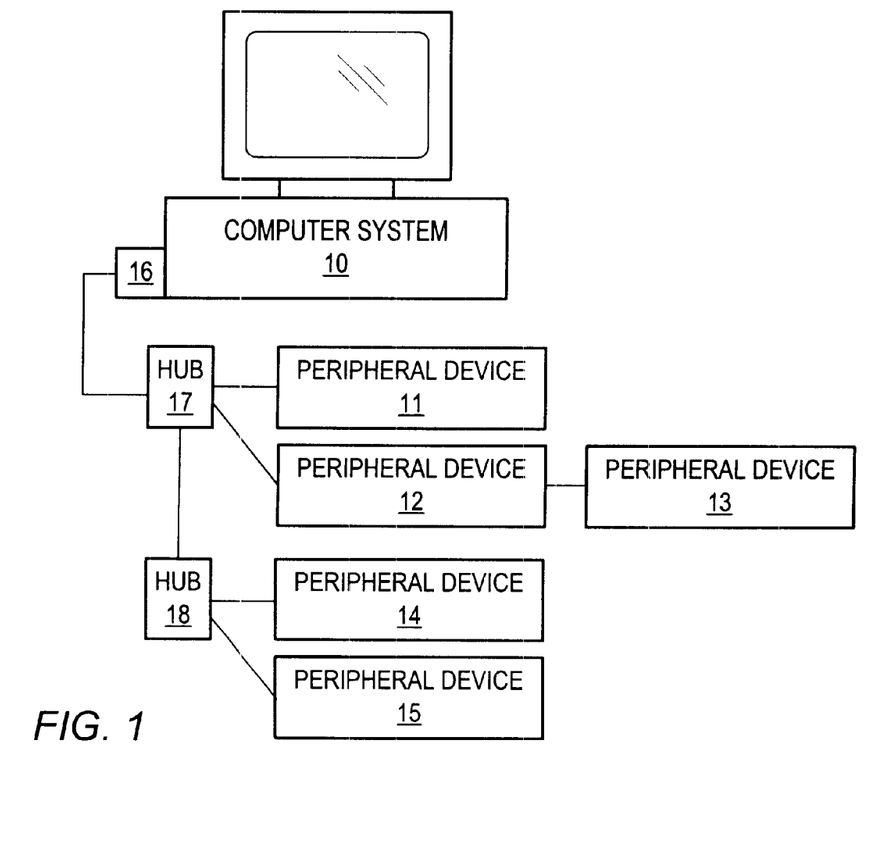
FIG. 1 is a block diagram illustrating the physical configuration of a plurality of USB peripheral devices attached to a computer system.

Referring to FIG. 1, the USB is a bus designed to provide a simple and efficient method for connecting external peripheral devices to desktop computer systems. The figure shows a computer system 10 connected to several peripheral devices 11–15. The devices are connected to the USB port 16 on the computer system via hubs 17–18. The use of hubs 17–18 on the USB enables users to expand the number of devices which can be connected to the computer system (as compared to the two or three which could be directly connected to a non-USB system.) The system may also include compound devices 12 which serve as both hubs and functional devices. (Note that device 13 is connected to the USB via compound device 12.)

Figure 2:
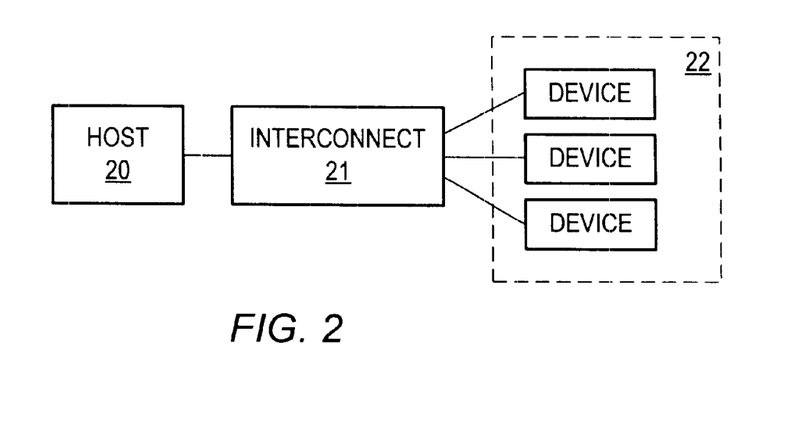
FIG. 2 is a block diagram illustrating the primary physical components of a USB system.

Referring to FIG. 2, a block diagram illustrating the primary physical components of a USB system is shown. The physical USB system can be described in three parts: a USB host 20; USB devices 22; and a USB interconnect 21. The first of these parts, the USB host, is the computer system which incorporates the USB root hub and forms the basis of the USB system. The second part, the USB devices, comprise the peripherals and functional devices which are to be connected to the computer system. USB "devices" may also refer to the hubs which can be connected to the USB to provide additional attachment ports. The third part, the USB interconnect, comprises the physical connections between the USB devices and the USB host, as well as the manner in which the devices communicate with host.

There is a single host associated with any USB system. The host is the computer system in which the USB system is implemented. The host incorporates a root hub of the USB which provides one or more attachment points for devices or other hubs. A host controller provides the interface between the host and the USB. The host controller may be implemented in one or a combination of hardware, firmware and software.

The USB devices are functional devices which provide capabilities to the system (e.g., an ISDN modem, a joystick or a set of speakers.) The USB devices may also be hubs which provide additional attachment points to the USB to which additional devices may be connected. (Non-hub devices are sometimes referred to as functions.) Some USB devices serve as both functional devices and hubs to which other devices can be attached. The USB Specification requires that all USB devices conform to certain interface standards and thereby ensures that the devices comprehend the USB protocol and respond to standard USB requests and commands.

Figure 3:
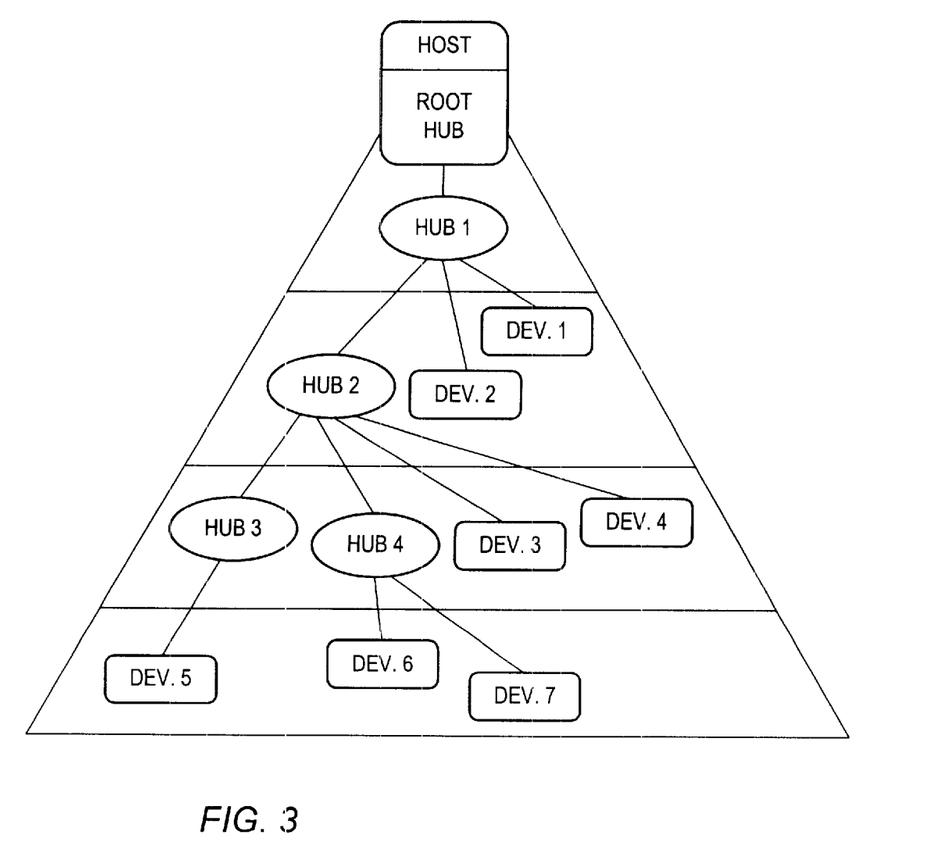
FIG. 3 is a block diagram illustrating the tiered star physical configuration of a plurality of devices connected to hubs on a USB interconnect.

The physical aspects of the USB interconnect are defined by the bus topology. (Although the bus topology includes non-physical aspects of the USB interconnect, they will be addressed elsewhere in this disclosure.) The bus topology describes the manner in which the USB connects USB devices with the USB host. Referring to FIG. 3, the physical configuration of the USB interconnect is that of a tiered star. The host has a root hub which forms the basis of the interconnect. Devices and/or additional hubs can be connected to the root and other hubs to form successive tiers of the interconnect. Thus, each hub forms the center of one of the stars in the tiered star configuration. Each wire segment in the interconnect is a point-to-point connection between the host or a hub and another hub or a device.

USB systems support "hot plugging". That is, USB devices may be attached to or removed from the USB at any time. The USB is designed to detect these changes in its physical topology and accommodate the changes in the available functions. All USB devices are connected to the USB at one of the hubs (either the root hub or one of the hubs chained from the root.) Attachment or removal of a device at a hub is indicated in the hub's port status. If a device is attached to the hub, the hub sends a notification to the host. The host then sends a query to the hub to determine the reason the notification was sent to the host. In response to this query, the hub sends the number of the port to which the device was attached to the host. The host then enables this port and begins communicating with the device via the control pipe (0 endpoint.) The host determines whether the attached device is a hub or a function and assigns a unique USB address to the device. The unique USB address and the 0 endpoint of the device are used as a control pipe for the device. If the newly attached device is a hub which already has devices attached to its ports, this same process is repeated for each of the attached devices. After a device has been attached and communications established between the device and the host, notifications are sent to interested host software.

If a device is removed from a hub, the hub disables the port to which the device had been attached and sends notification of the device's removal to the host. The host then removes the device and related data from any affected data structures. If the removed device is a hub to which other devices are attached, the removal process is repeated for each of the devices attached to the removed hub. Notifications are sent to interested host software indicating that the removed devices are no longer available.

Figure 4:
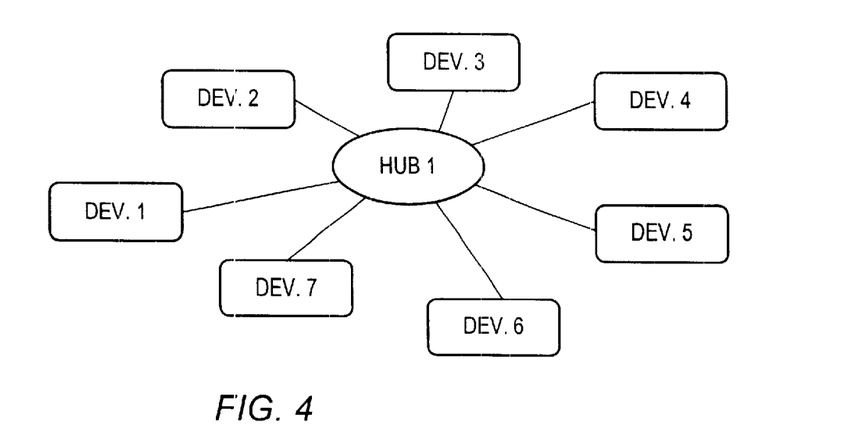
FIG. 4 is a block diagram illustrating the simple star logical configuration of a plurality of devices connected to a USB interconnect.

Although the physical topology of the USB interconnect is that of a tiered star configuration, the logical topology of the system is a simple star as shown in FIG. 4. Alternately, the logical configuration can be considered a series of direct connections between the individual USB devices and a client software application on the host. The logical relationship of the client software to the devices can also be thought of as one or more direct connections between the client software and the specific functions provided by the devices. While the view of the logical configuration as being a series of direct connections holds true for most operations, the system remains aware of the tiered physical topology so that devices downstream from a removed hub can be removed from the logical configuration when the hub is removed (see the discussion of hot-swapping above.)

Figure 5:
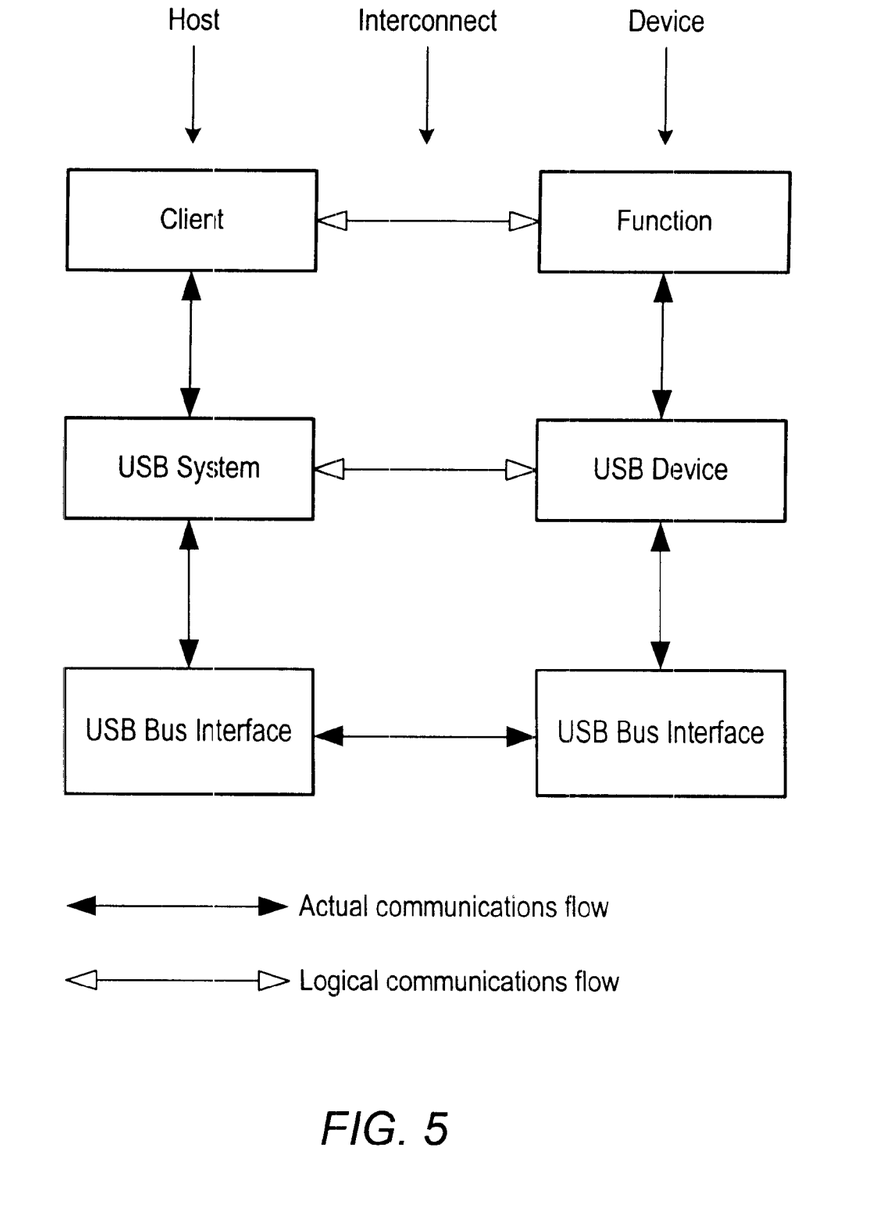
FIG. 5 is a functional block diagram illustrating the logical and physical flows of data within a USB system.
Figure 6:
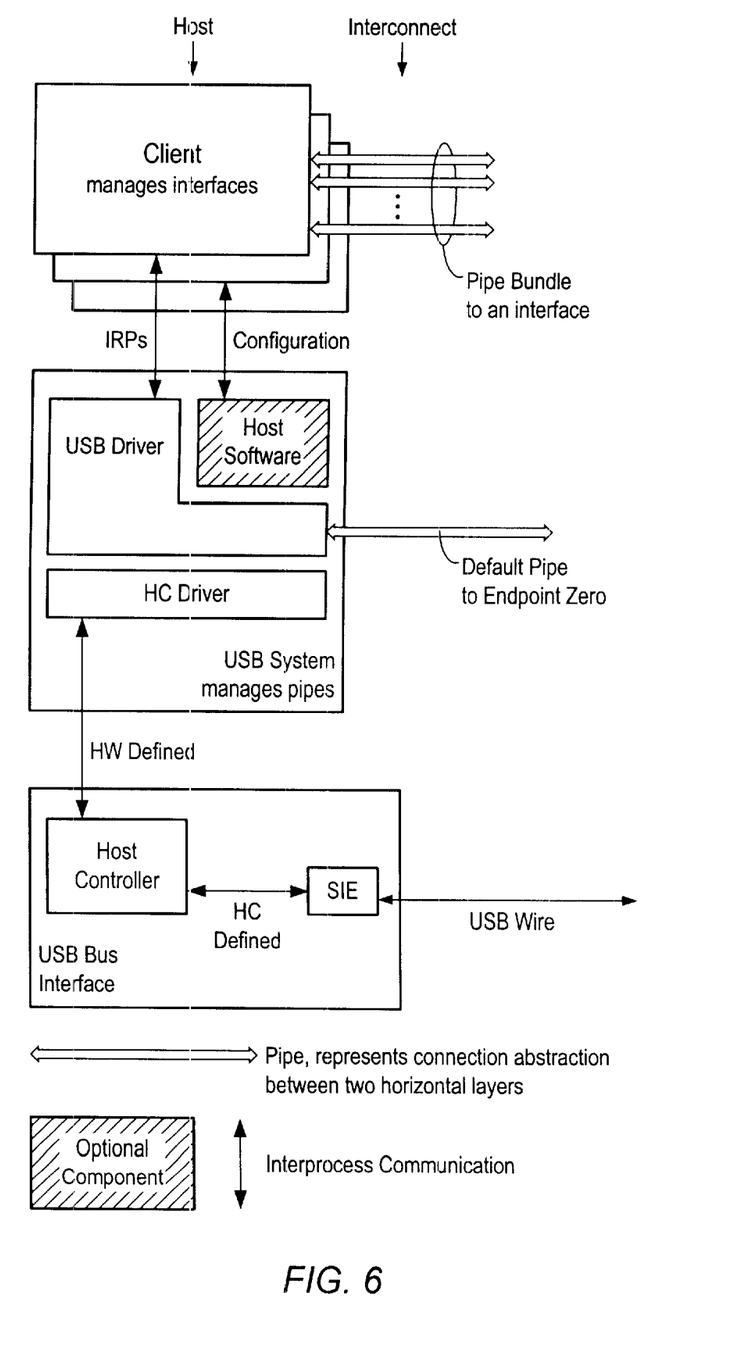
FIG. 6 is a functional block diagram illustrating the logical and physical flows of data within the host in a USB system.

The USB provides means for communications between client software running on the host and functions provided by the USB devices. FIGS. 5 and 6 illustrate the flow of data which is communicated between the client software and the device functions. The figures show the host as comprising three components: the client software; the USB system software (including USB driver, host controller driver and host of software); and the USB host controller. The host controller driver interfaces the host controller with the USB system software, and the USB driver interfaces the USB system software with the client software. FIG. 5 shows that the USB device also comprises three components: the function; the logical device; and the USB bus interface.

While the logical flow of information between the client software and the function is direct, the figure shows that the actual flow of data goes from the client software to the USB system software, to the USB host controller, to the USB bus interface, to the USB logical device and finally to the function. Likewise, although the logical flow of control information from the USB system software to the USB logical device is direct, the actual flow of information must go through the host controller and the bus interface.

Figure 7:
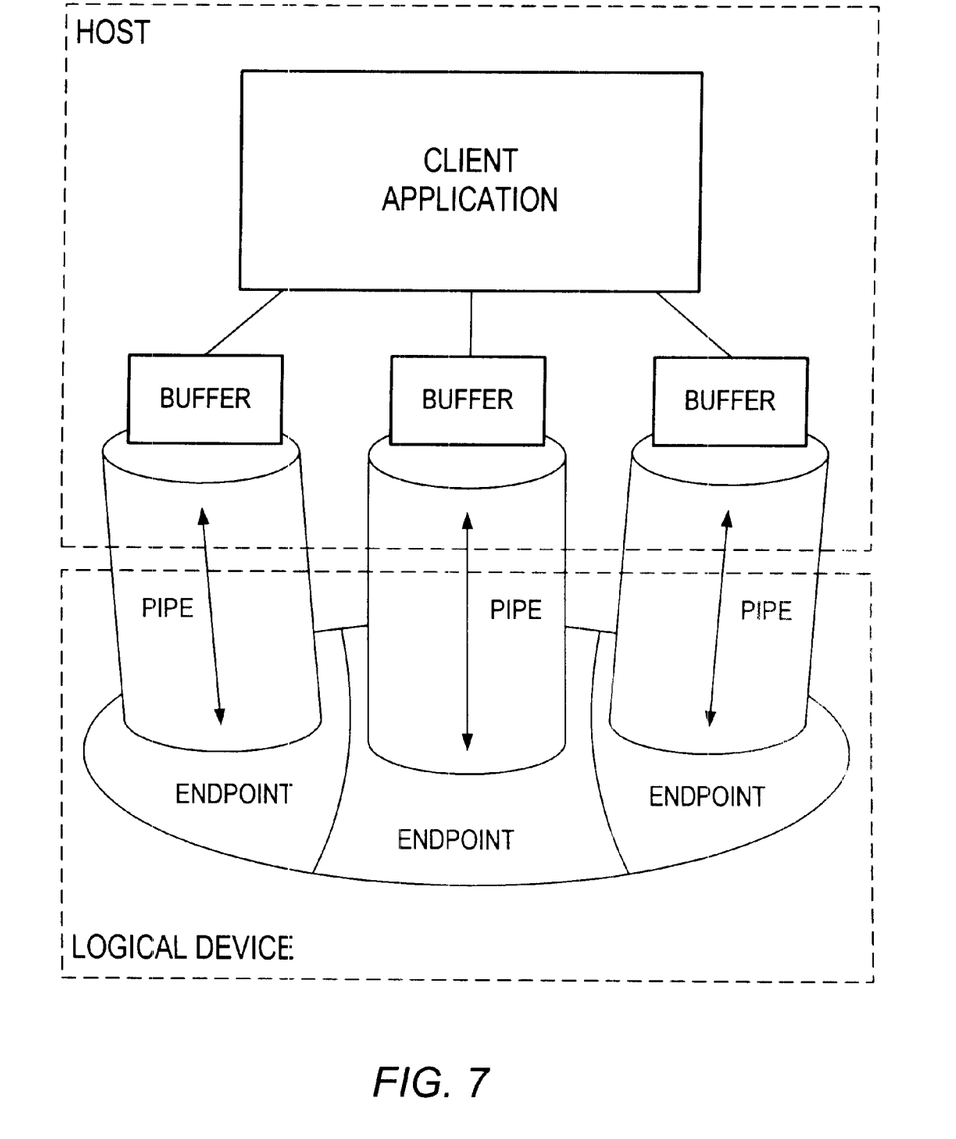
FIG. 7 is a diagram illustrating the flow of data between client software in the USB host and a plurality of endpoints in a USB device.

Referring to FIG. 7, a USB logical device is viewed by the USB system as an interface formed by a collection of endpoints. An endpoint is a uniquely identifiable portion of a USB device that forms the end of a communications path from the host to the device. Software may only communicate with a USB device via its endpoints. (The communications flow is illustrated in the figure by the arrows.) The number of each endpoint is determined by the designer of the device. The combination of a device address (assigned by the system at device attachment time) and the endpoint number allows each endpoint to be uniquely identified.

All USB devices are required to have an endpoint with number 0. This endpoint is used to initialize and manipulate (e.g., to configure) the logical device. Endpoint 0 provides access to the device's configuration information and allows access to the device for status and control purposes. Devices can have additional endpoints as required to implement their functions. Devices can have up to 16 additional input endpoints and 16 additional output endpoints (unless they are not full-speed devices, in which case they are limited to a reduced number of endpoints.).

The communications path between an endpoint on a device and software on the host is referred to as a pipe. A pipe comes into existence when a USB device is configured. Software clients normally request data transfers via I/O Request Packets (IRPs) to a pipe. The software clients then either wait or are notified when the requests are completed. Endpoint 0 has an associated pipe called the Default Pipe. The Default Pipe is used by system software to determine device identification and configuration requirements and to configure the device. The Default Pipe can also be used by device specific software after the device is configured, but the USB system software retains "ownership" of the Default Pipe and controls its use by client software.

Figure 8:
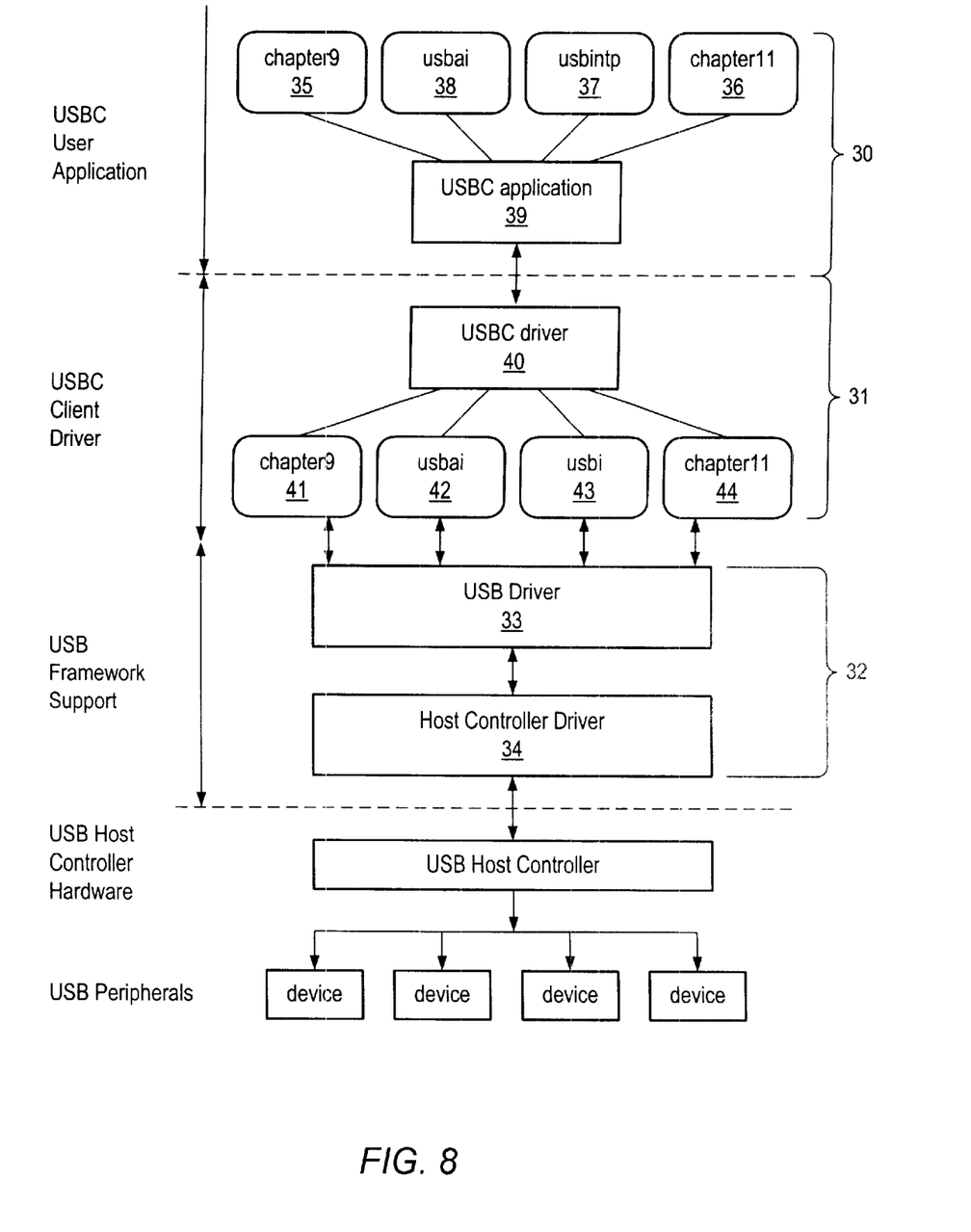
FIG. 8 is a diagram illustrating the structure of the USB test application in one embodiment of the invention.

Referring to FIG. 8, the software structure of one embodiment of the invention is shown. The client software in this embodiment comprises a test application 30 and a test application driver 31. The USB system software 32 comprises USB driver 33 and host control driver 34. The USB driver 33 and host control driver 34 are part of the USB Framework Support. The USB Framework Support is a Solaris™ based implementation of the USB system software and includes a set of interfaces (USB Architecture Interfaces, or USBAI) which allow third party vendors to write USB client drivers on a Solaris™ SPARC™ platform.

Test application 30 includes modules configured to control testing of the different functions of the USB system. In this instance, the separation of the modules' capabilities generally conforms to the separation of USB functionalities defined in the USB Specification. One module 35 controls the testing of the standard device requests defined in Chapter 9 of the USB Specification. This module is therefore referred to herein as a "Chapter 9" module. Module 38 controls the testing of the USBAI functions and is therefore referred to herein as a USBAI module. Another module (36) controls testing of hub standard requests as defined in Chapter 11 of the USB Specification. In the embodiment depicted in FIG. 8, the system also comprises module 37, which is an interpreter. This interpreter does not provide for the testing of a separate set of functions, but instead supports testing of all of the USB functions. The interpreter may be used in conjunction with the other modules to control testing of standard device requests, USBAI functions and standard hub requests. All of the modules are operatively coupled to the body of the test application 39.

Test application driver 31 is similarly structured, having a main driver component 40 and several modules 41–44 which correspond to the modules of application 30. Test application driver 31 is a loadable driver. That is, when a USB device is hot-plugged, the USB architecture framework will load the driver and create a device node for the newly installed device. If the device is hot-unplugged, the driver will be unloaded as to the unplugged device.

The test application may be run on any USB device after it is installed. In one embodiment, the test application runs a sui of tests to verify that a USB device can provide appropriate device information in response to all of the standard device requests defined in the USB Specification. The application opens a device node, constructs state information for the device and allocates system resources based on the state information. Test application driver 31 maintains the device state for use in testing the device. The Chapter 9 module 35 of the test application 30 formulates test requests and parameters based on the state information and conveys the test requests and parameters to the Chapter 9 module 41 of the test application driver 31 for validation. If the parameters are valid (i.e., within the allowable limits of the parameters,) the test requests (standard device requests) are packaged in a request structure which is passed to the test application driver. The Chapter 9 module 41 of the test application driver 31 validates the commands in the request structure and then conveys the requests to the USB device via the Default Pipe. The information provided by the device in response to the standard device requests is then returned to the test application.

In another embodiment, the test application can perform a series of tests to verify that the USB driver functions properly in response to USB interface function calls. The tests are performed in substantially the same manner as described above for the standard device requests. The test application opens a device node, retrieves device information, constructs device state information and allocates system resources for the tests. USBAI test application module 38 develops test parameters which are then verified by test application driver USBAI module 42. USBAI function calls are formulated based on the validated test parameters and the function calls are performed. The results of the function calls are then returned to the test application.

In one embodiment, a USB device to be tested is one of several which are connected to the USB. The test system examines the USB system to determine which devices are connected to the USB interconnect The USB system maintains information on the connected devices as part of its ongoing enumeration activity. The user is presented with a list of the connected devices. The user can then select one of the devices to be tested for the appropriate responses to the standard device requests or interface function calls. The user may also be presented with endpoint information corresponding to the devices and may select a particular endpoint to be tested.

Different embodiments of the invention may include various features. In one embodiment, the test system includes a command line interpreter. Using the command line interpreter, a user may input individual commands which are interpreted and executed by the application to test particular functions of the USB system. Thus, the user can perform individual standard device requests or USBAI function calls rather than the entire suite of Chapter 9 requests or interface function calls. This can eliminate unnecessary testing which would be performed by the comprehensive suite of tests. Commands may be set up to execute various combinations of operations, including standard device requests, USBAI functions and standard hub requests.

The command line mode also allows the test application to be used remotely. In other words, the user does not have to be physically present to test the USB system. The user may instead establish communications with the test system and enter commands through the communications link. For example, the user may establish a modem connection between a remote computer and the test system and then enter commands via the modem connection. The link may utilize any suitable means for communicating, and the example of the modem is intended to be illustrative rather than limiting.

The user may also execute commands which are unrelated to the test system (e.g., Unix shell commands) without having to interrupt the test session. The command line mode can be configured to alias the available commands to a unique list to reduce the amount of typing which is required. The test system can also be configured to provide online help to facilitate the user's interaction with the system.

One embodiment of the test system is configured with a functional mode in which the system can single-step through operations. This may be useful when the user needs to examine traffic on the USB. After a command is issued, USB traffic may be examined using a logic analyzer as the operation is performed.

Another feature which may be included is the capability of switching ports during testing. The user can select the device at a particular port for certain tests and then switch to a different port and test the device connected to that port. As mentioned above, the system's device enumeration activity is ongoing, so the user can select devices to be tested even when the devices are added after the test system begins executing. As devices are connected to the system, they are identified, corresponding state information is constructed, and they are made available to the system for testing.

In addition to determining device information for the purpose of testing the devices, the test system may be configured to make this information available to the user. Information such as device descriptors can be displayed in a matrix format to enable the user to make side-by-side comparisons of the characteristics of individual devices. Because bus enumeration is an ongoing activity in the USB system, devices are recognized as they are connected to the USB and the information which is normally obtained on the devices can be displayed alongside information for previously installed devices. Likewise, information corresponding to devices which are removed from the USB system can be removed from the display.

In one embodiment, the commands which can be input to the test system can be grouped into four categories: commands relating to device state information; standard device request commands; USB architecture interface commands; and miscellaneous commands. It is contemplated that the USB Specification may be amended to add, delete or modify the allowed commands to accommodate the changing functionality of the USB, and the test system may be adapted to include the new commands and functions of the USB.

The standard device requests are defined in Chapter 9 of the USB Specification. The standard device requests are shown in Table 1 along with their corresponding functions. All USB devices are required to respond to standard device requests from the host. These requests are made via the device's default pipe using control transfers. The request and the request's parameters are sent to the device in the setup packet.

TABLE 2

| | |
|---|---|
| get_status | Used to obtain status for a device, interface or endpoint. Device status consists of a remote_wakeup value corresponding to either enable or disable. The returned status in the interface field must be zero. The. returned status of an endpoint can be either stalled or not stalled |
| clear_feature | used to clear or disable two feature selectors: DEVICE_REMOTE_WAKEUP for the device; or ENDPOINT_STALL on specific endpoint address. The endpoint address can be obtained from the "get_descriptor" or "device_state" commands |
| set_feature | Used to set or enable two feature selectors: DEVICE_REMOTE_WAKEUP for the device; or ENDPOINT_STALL on a specific endpoint address. The endpoint address can be obtained from the "get_descriptor" or "device_state" commands. |
| set_address | Used only by system software. |
| get_descriptor | Used to return the descriptors for device, configuration, string or hub descriptors. All devices must provide a device descriptor and at least one configuration descriptor. The command returns the hub descriptor only in the devices is in the hub class. |
| set_descriptor | USB devices usually do not support this command. The stall condition should be returned |
| get_config | Returns the current configuration value. If the returned value is 0, the device is not configured. If the device is configured, a non-0 configuration value is returned. |
| set_config | Used to set the configuration value of the configuration descriptor. |
| get_interface | Used by the host to determine the currently selected alternate setting. |
| set_interface | Used by the host to set a selected alternate setting of an interface. |
| synch_frame | Used only for isochronous devices. This command should generate a stall condition. |

The USBAI commands are shown in Table 2 along with their corresponding functions. The USBAI commands are issued to a particular endpoint of a selected device. The USBAI functions corresponding to these commands can be executed in single-step mode in order to allow the user to examine traffic on the USB.

TABLE 2

| | |
|---|---|
| open_pipe | Used to open individual endpoints of USB devices. The open_pipe command takes an endpoint index as an argument for opening the pipe. The endpoint index can be obtained from the "device_state" command. |
| close_pipe | Used to close individual endpoints. This command takes an endpoint index as in argument for closing the pipe. The endpoint must be opened before if can be closed. The endpoint index can be obtained from the "device_state" commands. |
| start_polling | This command applies only to an interrupt endpoint. It is invalid if the argument is a non-interrupt endpoint. Before an interrupt endpoint can be polled, it must be opened using the "open-pipe" command. The endpoint index can be obtained from the "device_state" command. Most USB devices need some hardware event to generate an interrupt packet after the endpoint is polled |
| stop_polling | This command applies only to an interrupt endpoint. Polling must be started before it can be stopped. The endpoint index can be obtained from the "device_state" command. This command returns an error if the "start_polling" has not been executed on the endpoint. |
| set_policy | Sets the pipe policy. (Each pip has a set of pipe polices. The policy allows the system software to change the behavior of the pipe.) The height must be opened using "open_pipe" before the policy can be set. The two policy fields which can be set by the user are pp_max_transfer_size. |
| get_pipe | Used to read the pipe policy. The pipe must be opened using the "open_pipe" command before the policy can be read. |
| reset | Used to clear and released the associated resources allocated by the software. The pipe must be opened using the "open_pipe" command before the pipe can be reset. |
| clear_pipe | Used to perform a pipe_reset on the control endpoint. This command is usually used when there is stall condition. |
| set_private | Used to set a private data area in the USB client driver. This command is used to verify the usb_pipe_set_private USB architecture interface function. |
| get_private | Used to obtain private data that was set in the USB client driver. The set_private command must be used before the get_private command. The get_private command returns an error if the pipe is not been opened or if the set_private command has not been executed. |
| reserve | Used to release a pipe of an endpoint index. by calling usb_pipe_reserve in the USB module of the USB client driver. The pipe of the endpoint must be opened before the pipe can be reserved. |
| release | Used to release a pipe of an endpoint index. This command calls usb_pipe_release. The pipe of an endpoint must be opened and reserved before the pipe can be released. |
| get_addr | Used to perform the usb_addr USB architecture interface call on an endpoint index. The pipe must be opened before this command can be used. |
| interface# | Used to perform the usb_get_interface_number USB architecture interface call on an endpoint index. The pipe must be opened before this command can be used. |
| get_dev_desc | Used to perform the usb_get_dev_desc USB architecture interface call on an endpoint index. The pipe must be opened before this command can be used. |

TABLE 2-continued

| | |
|---|---|
| raw_config | Used to perform the usb_get_raw_config USB architecture interface call on an endpoint index. The pipe must be opened before this command can be used. |

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for testing the response of a USB device to one or more standard device requests comprising:

opening a node corresponding to a first USB device;

obtaining device information for said first USB device and constructing state information corresponding to said node;

formulating one or more tests for said node based on said state information;

performing said one or more tests, wherein performing said one or more tests comprises:

packaging said one or more tests in a request data structure; and conveying said requests in said data structure to said first USB driver;

generating responses to said one or more tests; and providing said responses to a user.

2. The method of claim 1 wherein said tests comprise standard device requests for said first USB device.

3. The method of claim 1 wherein opening said node corresponding to said first USB device comprises:

identifying one or more USB devices connected to a USB system;

selecting said first USB device; and opening said node corresponding to said first USB device.

4. The method of claim 1 further comprising validating a set of parameters used in said tests before conveying said tests in said data structure to said USB driver.

5. The method of claim 1 wherein said tests are selected in response to a command entered via a command line interpreter executing on a host computer to which said first USB device is connected.

6. The method of claim 5 further comprising:

establishing a communications link between a remote location and said host computer; and conveying said command from said remote location to said host computer.

7. A test system for verifying functions of serial bus system comprising:

a computer system wherein said computer system is configured to execute a test application and serial bus system software, wherein said test application includes a test application driver, wherein said serial bus system software includes a serial bus driver, wherein said computer system includes a host controller and wherein said host controller is driven by said serial bus system software;

a serial bus interconnect coupled to said computer system and configured to be controlled by said host controller;

wherein said test application is configured to formulate one or more tests to verify one or more functions of said serial bus system, perform said one or more tests and determine whether responses of said serial bus system to said one or more tests are valid;

wherein said computer system comprises a command shell, wherein said test application comprises a command line interpreter configured to accept test commands via individually entered command lines, and wherein a user may enter both shell commands and said test commands, said test commands being executed by said test system and said shell commands being executed by said command shell; and wherein said test application is configured to enumerate said plurality of serial bus devices and wherein said test commands are configured to designate a particular one of said enumerated serial bus devices.

8. The system of claim 7 further comprising a first serial bus device coupled to said serial bus interconnect, wherein said test application is configured to transmit a plurality of standard device requests to said serial bus device and to determine whether information provided by said serial bus device in response to said plurality of standard device requests is valid.

9. The system of claim 8 wherein said plurality of standard device requests is transmitted to said serial bus device individually, each said standard device requests being transmitted to said serial bus device in response to a corresponding command line entered by a user.

10. The test system of claim 9 wherein said computer system comprises a Unix operating environment, and wherein said test commands comprise Unix commands.

11. The test system of claim 9 further comprising a communications link between said computer system and a remote location and wherein said test commands are entered into said computer system from said remote location via said communications link.

12. The test system of claim 11 wherein data generated as a result of execution of said test command is transmitted to said remote location via said communications link.

13. A test system for verifying functions of a serial bus system comprising:

a computer system wherein said computer system is configured to execute a test application and serial bus system software, wherein said test application includes a test application driver, wherein said serial bus system software includes a serial bus system driver, wherein said computer system includes a host controller and wherein said host controller is driven by said serial bus system software;

a serial bus interconnect coupled to said computer system and configured to be controlled by said host controller;

wherein said test application is configured to formulate one or more tests to verify one or more functions of said serial bus system, perform said one or more tests and determine whether responses of said serial bus system to said one or more tests are valid;

wherein said plurality of standard device requests is transmitted to said serial bus device individually, each said standard device requests being transmitted to said serial bus device in response to a corresponding command line entered by a user; and wherein said first serial bus device is one of a plurality of serial bus devices coupled to said serial bus interconnect, wherein said test application is configured to enumerate said plurality of serial bus devices and to display data representative of said enumerated serial bus devices to said user, and wherein said first serial bus device is selected by said user from said enumerated serial bus devices.

14. The test system of claim 13 wherein said test application is configured to recognize attachment of one or more additional serial bus devices to said serial bus interconnect and wherein said test application is configured to recognize removal of one or more of said serial bus devices to said serial bus interconnect.

15. A method for testing the response of a serial bus device to one or more standard device requests comprising:

opening a node corresponding to a first serial bus device;

obtaining device information for said first serial bus device and constructing state information corresponding to said node;

formulating one or more tests for said node based on said state information;

performing said one or more tests, wherein performing said one or more tests comprises:

packaging said one or more tests in a request data structure; and conveying said requests in said data structure to said first USB driver;

generating responses to said one or more tests; and providing said responses to a user.

16. The method of claim 15, wherein said tests comprise standard device requests for said first USB device.

17. The method of claim 15, wherein opening said node corresponding to said first serial bus device comprises:

identifying one or more serial bus devices connected to a serial bus system;

selecting said first serial bus device; and opening said node corresponding to said first serial bus device.

18. The method of claim 15 further comprising validating a set of parameters used in said tests before conveying said tests in said data structure to said serial bus driver.

19. The method of claim 15 wherein said tests are selected in response to a command entered via a command line interpreter executing on a host computer to which said first serial bus device is connected.

20. The method of claim 19 further comprising:

establishing a communications link between a remote location and said host computer; and conveying said command from said remote location to said host computer.

21. A method for testing a function of a serial bus system in a computer, said serial bus system having a serial bus interconnect, one or more serial bus interfaces and one or more serial bus devices, the method comprising:

entering a test command on said computer;

interpreting said test command using a command line interpreter;

executing a test associated with said test command which transmits a test signal to said serial bus system, wherein executing said test occurs in a single-step mode; and validating a test result generated by said serial bus system in response to said test signal.

22. The method of claim 21 wherein said computer system is coupled to a remote location via a communications link and wherein entering said test command comprises entering said test command at said remote location and transmitting said test command over said communications link to said computer system.

23. The method of claim 21 further comprising entering a shell command on said computer and executing said shell command in an operating system shell running on said computer.

* * * * *